Nov. 14, 1961 P. J. MAZZIOTTI 3,008,311
UNIVERSAL JOINT
Filed April 29, 1960

INVENTOR.
PHILIP J. MAZZIOTTI
BY Walter E. Pavlick

ATTORNEY

United States Patent Office 3,008,311
Patented Nov. 14, 1961

3,008,311
UNIVERSAL JOINT
Philip J. Mazziotti, Toledo, Ohio, assignor to Dana Corporation, Toledo, Ohio, a corporation of Virginia
Filed Apr. 29, 1960, Ser. No. 25,679
9 Claims. (Cl. 64—8)

This invention relates to universal joints in general and more specifically to universal joints which are adapted to permit relative axial displacement between the torque transmitting shafts.

This type of universal joint has been widely used throughout the industry. The earliest and present form of this joint comprises a housing having a centrally located opening and axially extending slots. The housing is attached to one of a pair of torque transferring members, the other member being a shaft having a journal thereon. The shaft extends into the central opening in the housing and trunnions on the journal extend radially into the slots. Within the slots the trunnions are provided with bearing means which engage the sides of the slots. The slots and bearing means allow axial movement to take place between the torque transferring members, and it is through these trunnions that torque is transferred from one member to the other. In addition, the trunnions provide means whereby the pair of torque transferring elements can operate while their axes intersect at an angle.

In previous joints, the outward movement of the bearing means on the trunnions and of the trunnions themselves has been prohibited by the presence of abutment means disposed outwardly of the bearing means; the abutment means being either integral with the housing or assembled around the housing, such as a sleeve or the like. In this manner the shaft was centralized in the housing while permitting limited movement between the shaft and the housing. This method of restraining the bearing means resulted in expensive and highly exacting machining methods in addition to a type of engagement which is very susceptible to wear.

An object of this invention is to eliminate exacting groove machining operations by utilizing means inwardly from the end of the bearing means to restrain outward movement thereof.

Another object of this invention is to provide rolling contact between the bearing means and the housing upon relative movement thereof to reduce friction and the resultant wear.

A further object is to provide the above described rolling contact even when the shafts are transmitting torque with their axes intersecting at an angle.

A still further object of this invention is to provide a universal joint which is less expensive and better suited to present day manufacturing operations.

Further and more specific objects and advantages of this invention will be readily apparent from the following description and a consideration of the accompanying illustration wherein.

Figure 1:
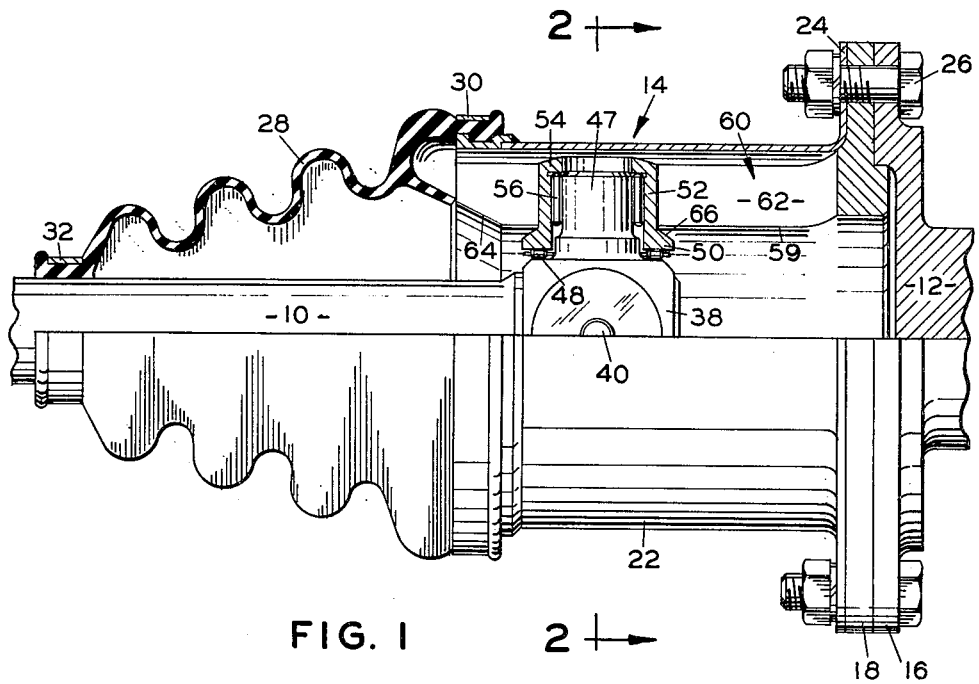
FIG. 1 is an elevational view partially in section of a universal joint embodying the invention.
Figure 2:
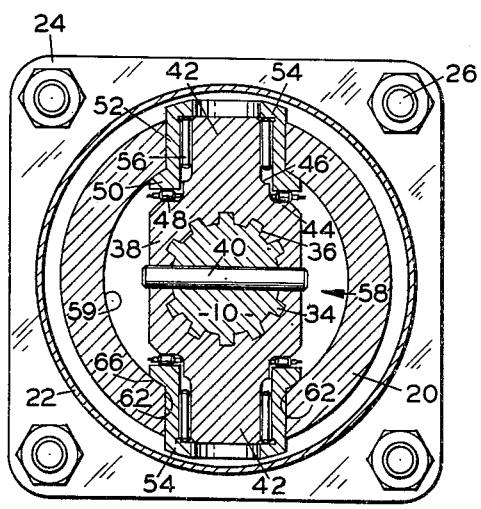
FIG. 2 is a cross sectional view of the universal joint taken substantially along the line 2—2 of FIG. 1 and looking in the direction of the arrows.

In one preferred embodiment this invention provides an improved type of bearing means and improved means for restraining outward movement thereof. This bearing means comprises a bearing sleeve rotatably disposed on a trunnion and having a shoulder which engages a housing at a location inwardly from the end of the bearing means. The ideal conception of this shoulder is a spherical configuration engageable with the housing inner wall which defines the shaft receiving opening. By providing a spherical shoulder with substantially the same radius as the opening within the houing, a line contact is maintained between the shoulder and the housing. This shoulder in addition to prohibiting outward movement of the bearing means induces the bearing means to rotate whenever axial movement occurs between the torque transferring members. This rotational engagement rather than sliding engagement results in a substantial reduction in wear.

Referring more particularly to the drawings a pair of torque transmitting shafts 10 and 12 are connected by a universal joint assembly indicated generally at 14. The torque transmitting shaft 12 is provided with an integral outwardly extending rectangular shaped flange 16. The flange 16 engages a corresponding flange 18 of an axially extending cylindrical housing 20. A cylindrical cover member 22 is spaced outwardly from and extends concentrically with housing 20 and has an outwardly extending flange 24 corresponding to and engageable with housing flange 18. Flanges 16, 18, and 24 are provided with aligned apertures (four in this instance) which receive bolts 26 to firmly secure the housing 20 and the cover member 22 for rotation with the torque transmitting shaft 12.

The cover member 22 is relatively rigid and has an end of a flexible boot 28 firmly secured to the end thereof by suitable clamping means 30. The flexible boot 28 telescopes inwardly and has its other end firmly secured to the torque transmitting shaft 10 by a clamp 32 to prevent dirt and foreign material from entering the joint and permit lubrication of the joint without excessive leakage along the shaft.

The inner end of shaft 10 is provided with splines 34 which cooperate with the splines of a bore 36 disposed centrally in a journal member 38. The shaft 10 and the journal member 38 are provided with aligned cross holes into which a cross pin 40 is pressed to fixedly secure the journal 38 on the torque transmitting shaft 10.

The journal member 38 is provided with opposed annular steps which terminate in radially outwardly extending trunnions 42. These steps define opposed inner annular surfaces 44 and outer annular abutment surfaces 46 on the journal 38. Each inner surface 44 seats a caged annulus of roller bearings 48 which is adapted to engage the base 50 of a bearing sleeve 52. Each bearing sleeve 52 extends around a trunnion 42 and the outer end thereof is provided with an inwardly extending annular lip 54. An annulus of needle bearings 56 is retained between the bearing sleeves 52 and the trunnions 42 by the annular lip 54 and the outer abutment surface 46 on the trunnions 42 to allow relatively frictionless rotation of the bearing sleeve with respect to the trunnions.

The end of the torque transmitting shaft 10 and journal 38 are positioned within a central opening 58 defined by the inner wall 59 of the cylindrical housing 20, and the trunnions 42 with the bearing sleeves 52 thereon extend into diametrically opposed axially extending slots 60 in the housing 20. The slots 60 extend substantially the full length of the housing and are preferably, though not necessarily, provided with straight parallel sides 62. The end of the housing 20 opposite flange 18 is provided with a bell mouth portion 64 to permit added clearance for the shaft 10 when the shafts 10 and 12 are transmitting torque with their axis intersecting at an angle.

Means is provided to prohibit outward movement of bearing sleeves 52 and also to facilitate relative axial movement of the torque transmitting shafts 10 and 12. More particularly, the outer surface of the base 50 of each bearing sleeve 52 defines an annular shoulder 66 which is adapted to engage the inner wall 59 of the housing 20. Preferably, the shoulder 66 is provided with a spherical configuration having substantially the same radius as the central opening 58 so that only a line contact is established with the inner wall 59. It should be particularly noted that the outer lip 54 of the bearing sleeves 52 does not contact the housing 20 or the cover member 22.

In operation, torque is transmitted from shaft 12 through housing 20, bearing sleeves 52, trunnions 42, to the journal 38 and shaft 10. Upon relative axial displacement between torque transmitting shafts 10 and 12 with the axis of the shafts aligned as shown in FIG. 1, the journal 38 on the end of shaft 10 will move in the central opening 58 of housing 20 and the outer periphery of bearing sleeves 52 will rollingly engage the side walls 62 of the axial slots 60. The shoulder 66 on the base 50 of each bearing sleeve 52, being of spherical configuration with a radius equal to that of the central opening 58, will establish a line contact with and rollingly engage the inner wall 59 of the housing 20. Rotational movement of the bearing sleeves 52 on the trunnions 42 is facilitated by roller bearings 48 and needle bearings 56.

Should relative axial displacement of the shafts 10 and 12 take place when they are transmitting torque with their axes intersecting at an angle, rolling contact will still be maintained between the annular shoulder 66 and the inner wall 59 of housing 20; thus, substantially reducing friction and the resultant wear common in prior constructions.

Furthermore, since the outer lip 54 of the bearing sleeves 52 do not engage either the housing 20 or the cover member 22, accurate and time consuming machining operations in this area have been eliminated.

The preferred embodiment of this invention has been shown and described, but changes and modifications can be made, and it is understood that this description is illustrative only and not for the purpose of rendering this invention limited to the details illustrated or described, except insofar as they have been limited by the terms of the following claims.

What I claim:

1. A universal joint comprising a housing having a shaft receiving opening and substantially axially extending slots, a shaft movingly disposed in said opening and having portions thereon extending outwardly into said slots, bearing means in said slots and rotatably disposed on the said portions, means on said bearing means engaging the housing within said opening to prevent outward movement of said bearing means, and bearing members positioned between said bearing means and said portions to aid rotational movement of said bearing means.

2. A universal joint comprising a housing having an inner wall defining a centrally located shaft receiving opening and also being provided with substantially axially extending slots, a shaft movingly disposed in said opening and having trunnions thereon extending radially into said slots, bearing sleeves in said slots and rotatably disposed on said trunnions, an annular shoulder carried by said bearing sleeves inwardly from the end thereof and engaging the inner wall of said housing to prohibit outward movement of said bearing sleeves, and bearing means positioned between said bearing sleeves and said trunnions to aid rotational movement of said bearing sleeves.

3. A universal joint comprising a housing having a centrally located shaft receiving opening and substantially axially extending slots, a shaft movingly disposed in said opening and having portions thereon extending outwardly into said slots, bearing sleeves in said slots and rotatably disposed on said portions, a shoulder formed integral with said bearing sleeves inwardly from the end thereof and engaging the housing to prevent outward movement of said bearing means, and bearing means positioned between said bearing sleeves and said portions to aid rotational movement of said bearing sleeves.

4. A universal joint comprising a housing having a centrally located shaft receiving opening and substantially axially extending slots, a shaft movingly disposed in said opening and having a portion thereon extending outwardly into said slots, bearing sleeves in said slots and rotatably disposed on said portions, an annular shoulder carried by each of said bearing sleeves and engaging the housing to prevent outward movement of said bearing sleeves, said shoulder being of curved configuration whereby rolling contact is established between said shoulder and said housing upon relative movement therebetween, and bearing means positioned between said bearing sleeves and said portions to aid rotational movement of said bearing sleeves.

5. A universal joint comprising a housing having an inner wall defining a centrally located shaft receiving opening and also being provided with slots extending substantially axially therein, a shaft movingly disposed in said opening and having a portion thereon extending outwardly into said slots, bearing sleeves in said slots and rotatably disposed on said portions, an annular shoulder carried by each of said bearing sleeves and engaging the inner wall of said housing to prohibit outward movement of said bearing sleeve, said shoulder having a spherical configuration with a radius substantially equal to that of said shaft receiving opening whereby line contact is maintained between said shoulder and said inner wall of the housing, and bearing means positioned between said sleeves and said portions to aid rotational movement of said bearing sleeves.

6. A universal joint comprising a housing having a centrally located shaft receiving opening and substantially axially extending slots, a shaft movingly disposed in said opening and having trunnions thereon extending outwardly into said slots, bearing means in said slots and rotatably disposed on said trunnions, and bearing members disposed at the base of said bearing means to facilitate rotation thereof.

7. A universal joint comprising a housing having a centrally located shaft receiving opening and substantially axially extending slots, a shaft movingly disposed in said opening and having trunnions thereon extending radially into said slots, bearing sleeves in said slots and rotatably disposed on said trunnions, bearing members positioned between said bearing sleeve and said trunnions to aid rotational movement of said bearing sleeve, bearing members engageable with the base of said bearing sleeve to further facilitate rotation thereof, and a shoulder on each of said bearing sleeves positioned inwardly from the end thereof and engageable with said housing to prohibit outward movement of said bearing sleeves, said shoulders having rolling contact with said housing upon relative movement therebetween to reduce wear.

8. A universal joint comprising a housing having an inner wall defining a centrally located shaft receiving opening and also being provided with substantially axially extending slots, a shaft movingly disposed in said opening and having oppositely extending trunnions projecting radially into said slots, bearing sleeves disposed in said slots and having the base thereof positioned in said central opening, an annulus of bearing members disposed between said bearing sleeves and said trunnions to facilitate rotational movement of said bearing sleeves, another annulus of bearing members engaging the base of said bearing sleeves to further aid rotational movement thereof, the base of each bearing sleeve defining an annular shoulder of spherical configuration for engagement with the inner wall of said housing to prohibit outward movement of said bearing sleeves, said spherical configuration having a radius substantially equal to that of the central opening whereby a line contact is established between said shoulder and the inner wall of said housing, said shoulder having rolling contact with said inner wall of the housing upon relative movement therebetween.

9. A universal joint comprising an elongated housing having an inner wall defining a centrally located shaft receiving opening, said housing being provided with a pair of axially straight elongated slots extending radially therethrough, cover means circumferentially surrounding said housing and enclosing said slots, a shaft movingly disposed in said opening, trunnions on said shaft extending radially into said slots, bearing sleeves positioned in said slots and rotatably disposed on said trunnions, said bearing sleeves being spaced from said cover means and engaging said housing within said slots, bearing means interposed between said bearing sleeves and said trunnions to aid rotational movement of said bearing sleeves, and an annular shoulder carried by each of said bearing sleeves and engaging the inner wall of said housing to prohibit outward movement of said bearing sleeves, said shoulder having a spherical configuration with a radius substantially equal to that of said shaft receiving opening whereby substantially line contact is maintained between said shoulder and said inner wall of said housing.

References Cited in the file of this patent

UNITED STATES PATENTS

| | | |
|---|---|---|
| 1,309,266 | Walter | July 8, 1919 |
| 1,983,533 | Brown | Dec. 11, 1934 |